United States Patent Office 3,108,121
Patented Oct. 22, 1963

3,108,121
PREPARATION OF DIBENZOFURAN
William Derek Walsh and Robert William Gunn Preston, both of Norton-on-Tees, Durham, England, assignors to Imperial Chemical Industries Limited, London, England, a corporation of Great Britain
No Drawing. Filed Sept. 18, 1961, Ser. No. 138,579
Claims priority, application Great Britain Oct. 3, 1960
8 Claims. (Cl. 260—346.2)

This invention relates to the preparation of dibenzofuran.

According to the present invention a process for the preparation of dibenzofuran or its homologues comprises contacting diphenyl oxide or homologues thereof at elevated temperature with a catalyst comprising platinum on charcoal.

Under the influence of the catalyst a dehydrogenation reaction takes place, one hydrogen atom being removed from one ortho position of each phenyl group and a second link being then formed between the two groups at these positions. It will, therefore, be understood that homologues of diphenyl oxide which may be used in the process of the present invention for preparing homologues of dibenzofuran should include an unsubstituted ortho position relative to the oxygen atom on each aromatic nucleus.

The process is preferably carried out under conditions in which the diphenyl oxide is in the vapour phase, within a temperature range of 450° to 550°, and more particularly at a pressure not substantially exceeding atmospheric pressure. At temperatures substantially below 450° C. the rate of reaction falls markedly and above about 550° C. the catalyst life is substantially decreased.

Preferably the catalyst contains a minor amount of platinum, for example 5% by weight, and may be in the form of granules. It may be prepared for example by impregnating carbon granules with a platinum compound which is then reduced to platinum. The charcoal may be obtained from any suitable source whether animal, vegetable or mineral. Preferably, however, it is obtained from vegetable sources, particularly from hardwood such as coconut. It should be substantially free from material such as sulphur and metals which can poison platinum catalyst, and preferably contains less than 5% residual ash. It may be treated to reduce ash content, for example by reflux with acid. It will be understood by those skilled in the catalyst art that the charcoal must have adequate adsorptive powers; for this reason it is preferably activated, for example by treatment with superheated steam to remove tarry matter from the pores thereof.

The catalyst is preferably prepared by impregnating the charcoal with a solution of a platinum salt such as platinum chloride, or with chlorplatinic acid, and subsequently decomposing the adsorbed platinum compound to platinum, for example by reduction with hydrogen.

After some hours of reaction, depending on the temperature and other reaction conditions, the catalyst activity declines. This effect may be delayed appreciably by contacting the catalyst with the diphenyl oxide in a suitable gas stream.

According to a preferred feature of the invention, therefore, the catalyst is contacted during the reaction with a gas stream comprising hydrogen or an inert gas such as nitrogen, the said gas stream preferably serving as a carrier gas for the diphenyl oxide.

The catalyst may also be regenerated by contact with hydrogen in the substantial absence of diphenyl oxide. According to a further preferred feature, therefore, the process is cyclic, with alternate reaction and regeneration sequences. The former are preferably of 3–8 hours' duration and the latter of 3–16 hours' duration. If hydrogen is used as a carrier gas during the reaction sequences, then the latter may be made appreciably longer than otherwise, while maintaining a reasonably high level of catalyst activity. Preferably also the reaction and regeneration sequences are carried out within the same temperature range and at substantially the same pressure.

Dibenzofuran and homologues thereof are useful intermediates for the preparation of dyestuffs and other useful chemicals, for example 2,2′-dihydroxydiphenyls, which may be prepared from dibenzofuran and its homologues by the process described in our copending application Serial No. 138,603.

The crude dibenzofuran product may be purified, for example, by distillation to remove unreacted diphenyl oxide.

The examples following illustrate the preparation of dibenzofuran according to the present invention. In each of these examples diphenyl oxide vapour was contacted with a catalyst packed in a reaction tube and comprising approximately 5% platinum on a proprietary, acid-washed charcoal in the form of ⅛–3/16 inch granules. The catalyst was prepared as follows. Hardwood charcoal granules known as type C grade, ⅛ inch to 3/16 inch, manufactured by Messrs. Farnell Carbons Ltd., and previously activated by steam at 900°–1000° C., was treated with 15% hydrochloric acid under reflux for 1 hour to reduce residual ash content. The charcoal was then washed acid-free with hot water and dried for 18 hours at 120° C. Its ash content was found to be less than 5%.

200 grams of the treated granular charcoal was then impregnated by soaking in a solution of 35 grams of platinum chloride in 104 mls. of distilled water, and dried at 120° C. The dried material was then reduced in a stream of hydrogen at 300° C. and finally cooled in a stream of nitrogen. The platinum content of the catalyst was found to be 5.4% by weight.

The reaction product of each example solidified in catch-pots connected to the outlet end of the reaction tube, and the conversion in each case was determined by infra-red analysis of the product.

The reaction temperature was 550° C. in Example 1 and 450° C. in each of the Examples 2 to 6.

The liquid space velocity was 1 hour$^{-1}$ in Examples 1 to 6 with the exception of Example 5, in which it was 3 hours$^{-1}$.

In Examples 3, 4 and 5 a carrier gas was employed at a rate of 1 litre of gas per 10 litres of diphenyl oxide feed as liquid.

In Example 6 catalyst regeneration sequences were effected by stopping the diphenyl oxide feed and blowing hydrogen at 50 litres per hour per 100 mls. of catalyst for 16 hours over the catalyst maintained at 450° C. Further details of the examples are given in the following table.

Table

| Example | Carrier gas | Percent Conversion at— | | | | | |
|---|---|---|---|---|---|---|---|
| | | 0 hrs. | 2 hrs. | 3 hrs. | 4 hrs. | 5 hrs. | 7 hrs. |
| 1 | Nil | 74 | 15 | 2 | | | |
| 2 | Nil | 69 | | | 40 | | |
| 3 | N$_2$ | 80 | | | 54 | | 34 |
| 4 | H$_2$ | 73 | | | 61 | | 63 |
| 5 | H$_2$ | 63 | | | 73 | | 62 |
| 6 | Nil | | | | | | |
| | 1st Regen | 73 | | 55 | | 40 | |
| | 2nd Regen | 58 | | 40 | | 29 | |

We claim:
1. A process for the preparation of dibenzofuran which comprises contacting diphenyl oxide in the vapor phase with a catalyst consisting essentially of platinum on charcoal.

2. A process according to claim 1 in which the catalyst contains about 5% by weight of platinum.

3. A process according to claim 1 in which the said charcoal is a hard wood charcoal with a low ash content.

4. A process according to claim 1 in which the charcoal is activated charcoal.

5. A process according to claim 1 in which the catalyst is contacted with said diphenyl oxide in a stream of gas selected from the group consisting of hydrogen and an inert gas.

6. A process according to claim 1 comprising alternately contacting the diphenyl oxide with the catalyst and regenerating the catalyst.

7. A process according to claim 6 wherein said contacting and regenerating steps are carried out at a temperature of about 450° C. and at about atmospheric pressure in a stream of gas containing hydrogen.

8. A process according to claim 1 in which the catalyst is contacted with said starting material at a temperature between about 450° and 550° C.

References Cited in the file of this patent

Rodd: Chem. Carbon Compounds, vol. IVA (1957), page 196.

Adkins: Reactions of Hydrogen (1937), pages 73–4.